United States Patent Office 2,773,910
Patented Dec. 11, 1956

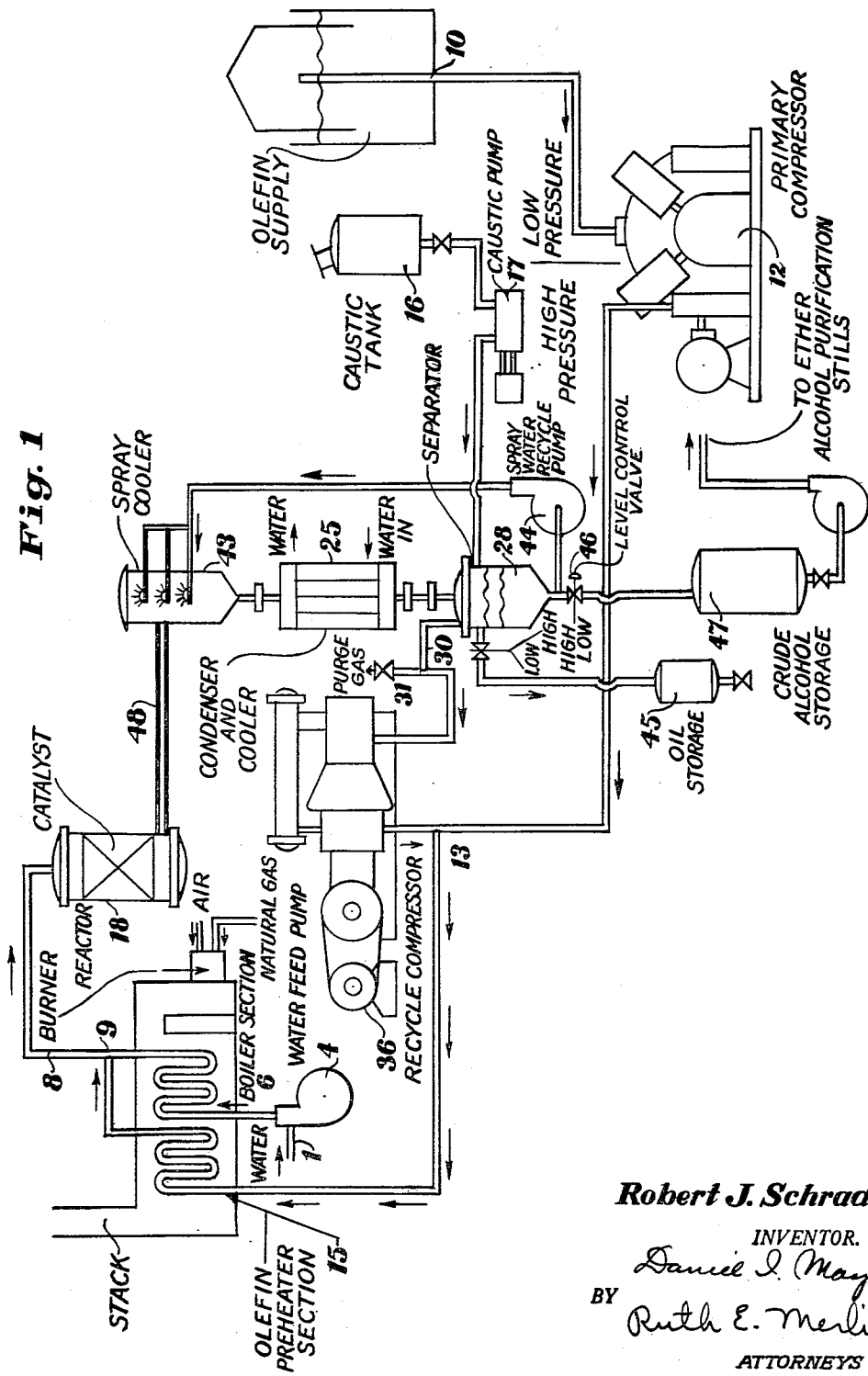

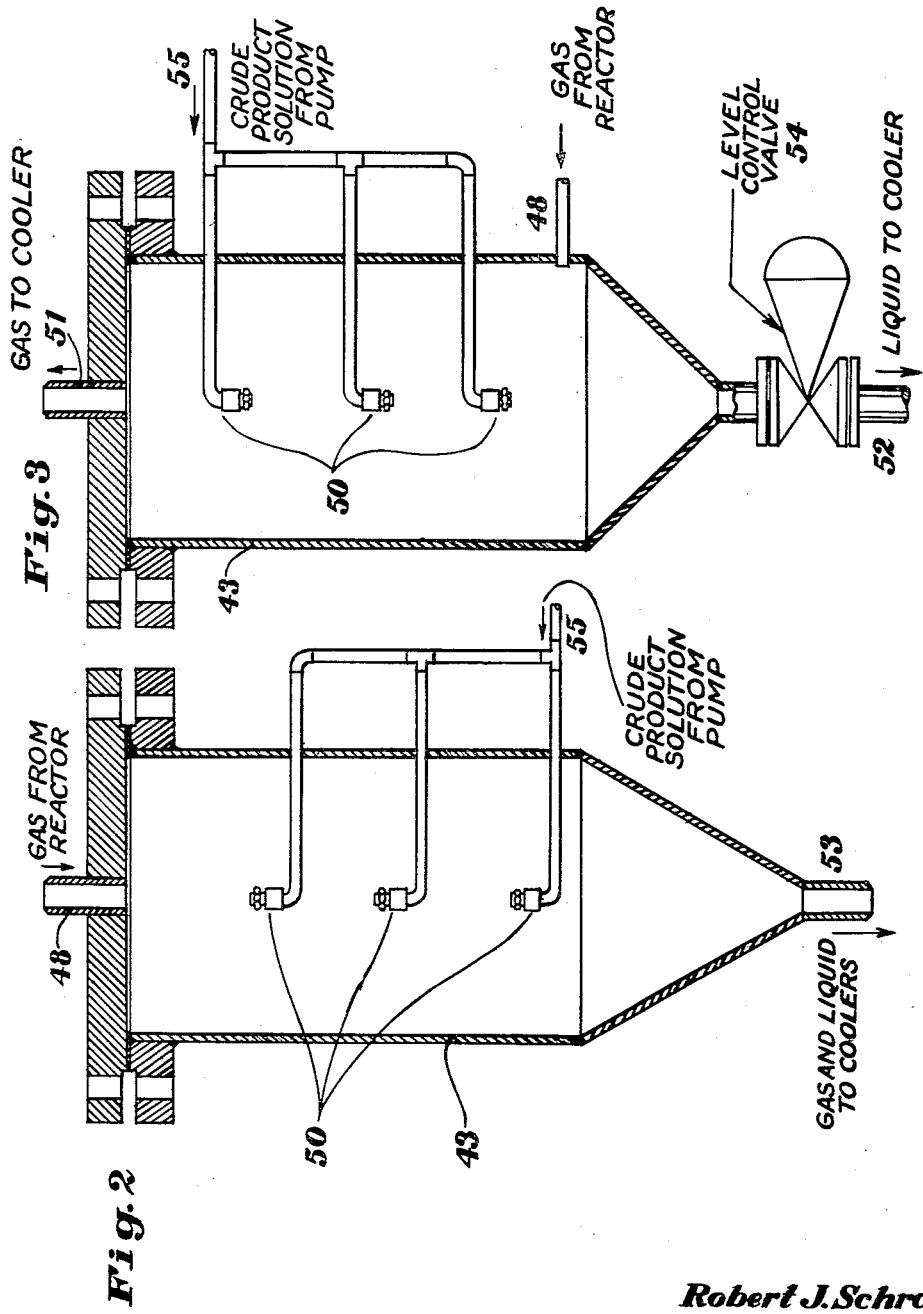

2,773,910

PROCESS OF PREVENTING CORROSION IN THE PRODUCTION OF ALCOHOLS BY HYDRATION OF OLEFINS

Robert J. Schrader, Longview, Tex., assignor to Eastman Kodak Company, Rochester, N. Y., a corporation of New Jersey Application July 31, 1952, Serial No. 301,926

3 Claims. (Cl. 260—641)

This invention relates to the hydration of olefins in the presence of a supported phosphoric acid catalyst. More particularly, it relates to an improvement in such a process, whereby corrosion of the equipment by the products issuing from the reactor is prevented.

Supported phosphoric acid catalysts are of two types. In one type, the phosphoric acid is absorbed in a porous or absorbent substance, such, for instance, as diatomaceous earth, charcoal, or certain types of clays. In the second, or film type catalyst, the phosphoric acid is spread on a non-absorbent support, such, for instance, as silicon carbide. Many supported phosphoric acid catalysts are shown in the art.

It is known to produce alcohols by passing olefins in admixture with suitable proportions of steam into intimate contact with a supported phosphoric acid catalyst at elevated temperature and pressure, removing the alcohol formed and the unreacted steam from the effluent gases, and recycling the unreacted olefin, together with makeup olefin and steam, into contact with the catalyst. In the case of ethylene, such a process is ordinarily carried out at temperatures of 250–300° C., and under pressures of the order of 1200 p. s. i. g. Only very low conversion of olefin to alcohol is obtained on a single pass of a mixture of olefin and steam through the catalyst bed. For instance, when a molar ratio of ethylene to steam of three to one is used, the conversion of the ethylene amounts to about 1% to 3% in commercial practice, depending upon reaction conditions. This may vary when other ratios are employed. The usual commercial operation of a process with a low conversion calls for the separation of products and the recycle of reactants. In the case of the hydration of olefins, the oxygenated products, mainly alcohol with some ether, can readily be separated, under reaction pressure if desired, by condensation along with the steam. The olefin is then recycled, makeup olefin and steam being added as required.

In the employment of such a cyclic process, the gaseous impurities originally present in the olefin or water recycle with the olefin, and build up as the olefin is used up. This amounts to a continuous dilution of the gaseous reactant stream with impurities. To maintain a constant reaction rate, it is desirable to remove a certain portion of the reaction stream, separate the impurities and return the purified olefin to the system.

All this has the result that for every volume of alcohol produced, a huge amount of gas is swept through the catalyst bed. Although phosphoric acid has a low vapor pressure, small amounts of phosphoric acid are vaporized or entrained by these large amounts of gases as they pass through the catalyst bed. When the gas stream leaving the reactor begins to cool, the phosphoric acid is the first component to condense out of the gas stream. When the hydration of ethylene is carried out at a pressure of 1200 p. s. i. g. and an ethylene to water mol ratio of 3 to 1, the temperature must be dropped to approximately 215° C. before the gas becomes saturated with water vapor. This means that the section of the cooler in which the gases are cooled from the reactor temperature of 250–300° C. to 215° C. is exposed to concentrated phosphoric acid at elevated temperatures. Stainless steel under these conditions will corrode very rapidly, and is unsatisfactory as a material of construction. Silver has proved to be satisfactory for such service, but the initial investment involved in lining the interior of the tubing of a heat exchanger with silver, and the necessity of making and keeping the lining pinhole-free, make this solution of the problem very expensive and hence undesirable.

We have discovered a method whereby corrosion of the cooler is prevented, and the necessity of using silver lining in large and complicated pieces of equipment is avoided.

Once the gases are cooled to a point where they are saturated with water vapor, further cooling results in a condensation of water which dilutes any phosphoric acid present in the gas stream to such an extent that the liquid in contact with the condenser tubes is not corrosive to stainless steels. If, immediately upon leaving the reactor, the gas stream is brought into contact with a quantity of water more than sufficient to saturate the gas stream, any possibility of condensation of concentrated phosphoric acid in the cooler is completely eliminated, since water will be condensing out on the metal surface at the same time. While pure water is satisfactory for the prevention of corrosion in the cooler, the introduction of pure water into the gas stream issuing from the reactor further dilutes the alcohol formed, and makes its subsequent purification by distillation more difficult and expensive.

In the process of our invention, the crude alcohol solution which condenses from the gaseous product stream when this gas stream is cooled, is substantially neutralized and a portion of it is recycled under pressure, by means of a pump, back to a spray cooler in or at the top of the cooler through which the gas stream issuing from the reactor is passed. This solution dilutes the phosphoric acid present in the gas stream, increases the rate of heat transfer in the cooler, and in addition, prevents dilution of the crude product. The only section of the system which is now exposed to corrosion by concentrated phosphoric acid is the line between the reactor and the spray cooler. This is made as short as possible, and lined with sheet silver, in order that any phosphoric acid which comes in contact with the interior surface of the piping will not cause corrosion. Lining this short section of piping is neither different nor expensive as compared with lining the interior of the tubing of a heat exchanger.

In the cooler, in or at the top of which the spray cooler is set, the gas stream from the reactor is cooled to 30–40° C., and the mixture of liquid and gas leaving the cooler passes into a high pressure separator where the condensed liquid is separated from the gas. The gas leaving the separator returns to the recycle compressor, to be recycled through the system. The liquid in the separator is the crude alcohol product manufactured in the high pressure system. This liquid is substantially neutralized by addition of caustic to the separator. It is a portion of this substantially neutralized liquid which is returned to the spray cooler for cooling the gases which issue from the reactor. The remaining portion of this substantially neutralized liquid from the separator is purified by distillation, to give pure alcohol.

Figure I is a flow diagram of a process of olefin hydration, showing in a general way the connection of the spray cooler with the system.

The feed olefin to the cyclic system enters at 10. It is compressed by means of pump 12 to the desired pressure, and introduced into the recycle olefin gas stream at 13.

The recycle gas stream passes through olefin preheater 15 prior to mixing with hot steam at 9.

The steam is produced in the following manner: Water enters in pipe 1 and is pumped by pump 4 into boiler 6, where it is converted into steam and heated to the desired temperature prior to mixing with the olefin in line 8 at junction 9.

The hot steam and hot olefin gas stream pass through line 8 into the hydration reactor 18 which contains the supported phosphoric acid catalyst. The hydration reactor may be heated or cooled to maintain it at the desired temperature, but with proper regulation of the temperature of the entering gases and suitable insulation of the reactor, provision for heating or cooling may be unnecessary.

The mixture of steam and olefin passes through the catalyst bed in the reactor, where a portion of the olefin and water react to form the corresponding alcohol. Small amounts of the corressponding dialkyl ether and polyalkylene oil are also formed. The mixture of gases leaving the reactor 18 enters spray cooler 43, which is joined to the reactor by a short length of silver-lined pipe 48. In the spray cooler the gas mixture meets an aqueous spray provided by recycling to the spray cooler, by means of spray water recycle pump 44, a portion of the substantially neutralized crude alcohol solution which is formed by condensation from the reactor gases and subsequent substantial neutralization by means of a caustic solution pumped from caustic tank 16 into separator 28 by caustic pump 17. The mixture of gases and recycled crude products leaves the spray cooler 43 and passes through a condenser cooler or coolers 25 in which steam and alcohol are condensed from the unreacted olefin. This mixture passes to a separator 28 where the liquid is separated from the unreacted olefin. The gas stream from the separator then passes back through the pipe 30 to the suction side of the recycle compressor 36. The liquid collected in the separator 28 divides into an oil layer and a water layer. The oil layer is drawn off to an oil storage tank 45, and the crude product passes through a level control valve 46 to the crude alcohol storage tank 47. From this tank the crude mixture is pumped to purification stills where pure alcohol and ether are obtained.

Since the olefin feed contains some inert gases, these will build up in the system. The ratio of olefin to inert gases in the recirculating gas stream can be maintained at any desired level by continuously or periodically withdrawing a portion of the recycled gas from the system through the purge gas line 31. This purge gas will normally be treated to recover its olefin content.

It will be understood that Figure I is merely a flow diagram, and is not intended to represent the physical form or arrangement of the apparatus.

In the case of ethylene hydration under the conditions described above, the cooled, substantially neutralized crude alcohol solution recycled to the spray cooler lowers the temperature of the product stream to about 191–210° C., at which temperature a considerable amount of the steam in the product stream condenses out. The addition of the recycled neutralized crude alcohol also lowers the acid concentration of the condensed products.

The portion of the liquid from the product separator 28 which is recycled to the spray cooler may be from 50% to as high as 100% or more at times.

The design of the spray cooler is not critical, the only requirement being that the gas stream coming from the reactor must come into intimate contact with the recycled, substantially neutralized crude product solution in order to be sure that all phosphoric acid is removed from the gas system. The nozzles which I have used in the spray cooler are of commercial design. Fog nozzles which give a fine mist do an excellent job of scrubbing the gases which issue from the reactor.

Figures II and III show typical piping arrangements which can be used for spray cooling the gases from the reactor. In these figures, the spray cooler 43 contains a set of spray nozzles 50, to which the substantially neutralized crude product solution from the spray water recycle pump 44 is supplied at 55. In Figure II, in which the spray nozzles are directed upward, the gas stream from the reactor enters the top of the spray cooler 43 through the silver-lined pipe 48, and the gas and liquid leave the bottom of the spray cooler 43, through pipe 53, through which they go to the cooler 25 and separator 28. In Figure III, in which the spray nozzles are directed downward, the gas stream from the reactor enters the spray cooler 43 through the silver-lined pipe 48 at the side near the bottom: the gas leaves the top of the spray cooler through pipe 51 on its way to a gas cooler, and the liquid leaves the bottom of the spray cooler through level control valve 54 and pipe 52 on its way to a liquid cooler. Alternatively, in Figure III, the top of the spray cooler 43 may be flanged directly to the gas cooler, eliminating the high pressure piping connection. Other designs and arrangements of the spray cooler may be made, the figures being merely illustrative.

It will be obvious that the crude product alcohol need not be recirculated directly from the separator, but that it may be recirculated from the crude alcohol storage tank, by connecting the spray water recycle pump to the crude alcohol storage tank. In other words, although the recycled crude alcohol must be under pressure when it enters the spray cooler, it need not have been continuously under pressure since its formation.

While I have spoken specifically of a molar ratio of ethylene to steam of 3:1, I have operated the process successfully at molar ratios of ethylene to steam of from 4:1 to 1:1, and operation with other ratios may be practicable.

What I claim as my invention and desire to be secured by Letters Patent of the United States is:

1. In a cyclic process for the manufacture of an alcohol by the reaction, at elevated pressure and temperatures of the order of 250°–300° C., of an olefin and steam in contact with a supported phosphoric acid catalyst in a reactor, a method of preventing condensation of concentrated phosphoric acid on the walls of the product stream cooler, while avoiding dilution of the product, which comprises the steps of introducing the product gas stream substantially at the reaction temperature and pressure into the product stream cooler and simultaneously spraying under pressure, into direct contact with the product gas stream in the product stream cooler, a spray of the crude product alcohol solution which has been cooled and substantially neutralized, the amount of cooled, substantially neutralized, crude product alcohol solution recycled to the product stream cooler in any given period being at least 50% of the amount of crude product alcohol solution obtained within that period, and being sufficient, without other cooling means, to reduce the temperature of the product gas stream at least to the temperature at which it is saturated with water at the pressure prevailing in the product stream cooler.

2. In a cyclic process for the manufacture of ethyl alcohol by the reaction, at a temperature of from 250° to 300° C. and a pressure of the order of 1200 p. s. i. g., of ethylene and steam in a molar ratio of 3:1, in contact, in a reactor, with a supported phosphoric acid catalyst of the type in which one phosphoric acid is absorbed in a porous substance, a method of preventing condensation of concentrated phosphoric acid on the walls of the product stream cooler, while avoiding dilution of the product, which comprises the steps of introducing the product gas stream substantially at the reaction temperature and pressure into the product stream cooler and simultaneously spraying under pressure, into direct contact with the product gas stream in the product stream cooler, a spray of the crude product alcohol solution which has been cooled and substantially neutralized, the amount of cooled, substantially neutralized, crude product alcohol solution recycled to the product stream cooler in any given period being at least 50% of the amount of crude product alcohol solution obtained within that period, and being sufficient, without other cooling means, to reduce the temperature of the product gas stream at least to approximately 191–210° C.

3. In a cyclic process for the manufacture of ethyl alcohol by the reaction, at a temperature of from 250° to 300° C. and a pressure of the order of 1200 p. s. i. g., of ethylene and steam in a molar ratio of from 1:1 to 4:1, in contact, in a reactor, with a supported phosphoric acid catalyst of the type in which the phosphoric acid is absorbed in a porous substance, a method of preventing condensation of concentrated phosphoric acid on the walls of the product stream cooler, while avoiding dilution of the product, which comprises the steps of introducing the product gas stream substantially at the reaction temperature and pressure into the product stream cooler and simultaneously spraying under pressure, into direct contact with the product gas stream in the product stream cooler, a spray of the crude product alcohol solution which has been cooled and substantially neutralized, the amount of cooled, substantially neutralized, crude product alcohol solution recycled to the product stream cooler in any given period being at least 50% of the amount of crude product alcohol solution obtained within that period, and being sufficient, without other cooling means, to reduce the temperature of the product gas stream at least to the temperature at which it is saturated with water at the pressure prevailing in the product stream cooler.

References Cited in the file of this patent

UNITED STATES PATENTS

| | | |
|---|---|---|
| Re. 23,507 | Maycock | May 27, 1952 |
| 2,142,036 | Rowland et al. | Dec. 27, 1938 |
| 2,313,196 | Quinot | Mar. 9, 1943 |
| 2,648,711 | Carrier | Aug. 11, 1953 |